(12) United States Patent
Koike et al.

(10) Patent No.: US 9,080,131 B2
(45) Date of Patent: Jul. 14, 2015

(54) METHOD FOR PRODUCING HIGH CONCENTRATION OZONATED WATER AND DEVICE FOR PRODUCING HIGH CONCENTRATION OZONATED WATER

(75) Inventors: Kunihiko Koike, Moriyama (JP); Sadaki Nakamura, Moriyama (JP); Naohisa Makihira, Moriyama (JP); Koichi Izumi, Moriyama (JP); Goichi Inoue, Moriyama (JP); Norikazu Hohshi, Yao (JP); Takashi Minamihonoki, Yao (JP)

(73) Assignees: SHARP KABUSHIKI KAISHA, Osaka-Shi (JP); IWATANI CORPORATION, Osaka-Shi (JP)

( * ) Notice: Subject to any disclaimer, the term of this patent is extended or adjusted under 35 U.S.C. 154(b) by 219 days.

(21) Appl. No.: 13/703,139

(22) PCT Filed: Nov. 25, 2010

(86) PCT No.: PCT/JP2010/071007
§ 371 (c)(1),
(2), (4) Date: Dec. 10, 2012

(87) PCT Pub. No.: WO2011/158397
PCT Pub. Date: Dec. 22, 2011

(65) Prior Publication Data
US 2013/0079269 A1  Mar. 28, 2013

(30) Foreign Application Priority Data
Jun. 18, 2010  (JP) .................. 2010-138935

(51) Int. Cl.
*C11D 7/04* (2006.01)
*C01B 13/11* (2006.01)
*C11D 3/39* (2006.01)

(52) U.S. Cl.
CPC . *C11D 7/04* (2013.01); *C01B 13/11* (2013.01); *C11D 3/3947* (2013.01)

(58) Field of Classification Search
CPC ........ C11D 13/11; C11D 3/3947; C11D 7/04; B01D 53/047; B01D 53/02
USPC ..................................... 422/186.07
See application file for complete search history.

(56) References Cited

FOREIGN PATENT DOCUMENTS

JP          2-131531        11/1990
(Continued)

OTHER PUBLICATIONS

Japanese Office Action with partial English Summary dated May 27, 2014, 7 pages.
Chinese Office Action with partial English Summary dated Apr. 30, 2014, 11 pages.
International Search Report filed in PCT/JP2010/071007.
(Continued)

*Primary Examiner* — Xiuyu Tai
(74) *Attorney, Agent, or Firm* — Rankin, Hill & Clark LLP

(57) ABSTRACT

The disclosed device and method produce high concentration ozonated water by connecting a high concentration ozone gas-supplying system that comprises an ozone gas-generating unit (1) for forming ozone gas, an ozone gas-concentrating unit (2) for concentrating the ozone gas formed, a concentrated ozone gas-pressurizing unit (3) for pressurizing the concentrated ozone gas output from the ozone gas-concentrating unit (2), and a cooling mechanism (13) for cooling the concentrated ozone gas-pressurizing unit (3), to an ozone gas-dissolving unit (4) to dissolve the high pressure, concentrated ozone gas in pure water and produce the high concentration ozonated water.

3 Claims, 2 Drawing Sheets

(56) References Cited

FOREIGN PATENT DOCUMENTS

| | | |
|---|---|---|
| JP | 2-131531 U | 11/1990 |
| JP | 10-018976 | 1/1998 |
| JP | 3761891 | 3/2006 |
| JP | 2008-143729 | 6/2006 |
| JP | 2009-56442 | 3/2009 |
| JP | 2009-112979 | 5/2009 |
| JP | 2009-136822 | 6/2009 |
| JP | 4296393 B2 | 7/2009 |
| WO | 2008/062534 | 5/2008 |

OTHER PUBLICATIONS

Title Page for WO 2008/062534, English abstract for WO 2008/062534, which was filed in an Information Disclosure Statement on Dec. 12, 2012.
Patent Abstracts of Japan, English abstract for JP 2009-112979, which was filed in an Information Disclosure Statement on Dec. 12, 2012.
Patent Abstracts of Japan, English abstract for JP 2009-056442, which was filed in an Information Disclosure Statement on Dec. 12, 2012.
Patent Abstracts of Japan, English abstract for JP 2005-005326, which was filed in an Information Disclosure Statement on Dec. 12, 2012 as JP 4296393.

METHOD FOR PRODUCING HIGH CONCENTRATION OZONATED WATER AND DEVICE FOR PRODUCING HIGH CONCENTRATION OZONATED WATER

The present invention relates to a producing method and producing device for ozonated water, which is used for cleaning precision electronic components such as semiconductors, liquid crystal displays and the like and general industrial components, or for cleaning and disinfecting pharmaceutical and food appliances, food and the like.

BACKGROUND ART

Conventionally, in cleaning industrially manufactured components, or in a cleaning or sterilization and disinfection process in the pharmaceutical and food field, a great amount of chemical agent or gas which involves heavy environmental load has been used. However, addressing global environmental protection, what is currently required is a cleaning or sterilization and disinfection technique with light environmental load. Accordingly, in recent years, ozonated water with light environmental load is gathering attention.

In particular, in removing organic substances including circuit pattern formation-purpose photoresist used in manufacturing precision components such as semiconductors, liquid crystal displays and the like, conventionally, mixture of sulfuric acid and hydrogen peroxide solution, alkaline aqueous solution, or various organic solvents have been used as the cleaning agent. However, for the purpose of environmental protection, attempts to replace them by ozonated water have been made in recent years.

As one example, a method for removing organic substances using ozonated water is proposed in Patent Document 1. The patent proposes to set the water temperature to 45° C. or more for improving the removal effect of organic substances by ozonated water, and to inject carbon dioxide gas for stabilizing the ozonated water concentration.

Further, in order to further improve the removal effect, what is proposed is an ozonated water producing device with which the temperature of ozonated water is set to 70 to 80° C., and the concentration is increased to about 110 mg/L (Patent Documents 2 and 3).

However, even when the high concentration and high temperature ozonated water generated by the conventional devices are used in removing the organic substances (photoresist), the decomposition speed of the resist and the stability of the removal effect are still unsatisfactory. This is because the decomposition reaction of the resist by the ozone molecules is still at the ozone supply rate determining step, not reaching to the reaction determining step.

In order to solve the problem, it is effective to further increase the ozone concentration of the high temperature ozonated water of 70 to 80° C. In order to increase the ozone concentration of the high temperature ozonated water at least twice as great as the conventional concentration, it is essential to cause the ozone mixing concentration of room temperature ozonated water, which is generated prior to heating, to be at least twice as great as that in the conventional techniques (320 mg/L or more to 160 mg/L of that in the conventional techniques).

Further, one of the applicants of the present invention has previously proposed an adsorption scheme concentrating method for concentrating ozone gas, in which property of the ozone molecules adsorbing other substances is used (Patent Document 4).

PRIOR ART DOCUMENTS

Patent Documents

Patent Document 1: Japanese Patent No. 4296393
Patent Document 2: Japanese Unexamined Patent Application Publication No. 2009-56442
Patent Document 3: Japanese Unexamined Patent Application Publication No. 2009-112979
Patent Document 4: WO 2008/062534

SUMMARY OF THE INVENTION

Problems to be Solved by the Invention

The currently proposed high concentration and high temperature ozonated water is generated by the following procedure. Ozone gas whose concentration is about 250 g/m$^3$ (N) supplied from an ozone gas supply source and water are subjected to gas-liquid mixing at room temperature, and thus room temperature ozonated water is once generated at the concentration of about 160 mg/L. Then, by heating the room temperature ozonated water by a heater, high concentration and high temperature ozonated water whose concentration is about 110 mg/L and temperature is 70 to 80° C. is generated.

As described above, in order to increase the concentration of the high concentration and high temperature ozonated water to be at least twice as great as the conventional concentration, the concentration of the room temperature ozonated water must also be increased to be at least twice as great as the conventional concentration (320 mg/L or more).

In order to increase the concentration of the room temperature ozonated water to be at least twice as great as the conventional concentration, the following two schemes may be possible. The first scheme is to increase the concentration of the ozone gas to be mixed with water. The second scheme is to improve the mixing efficiency of the ozone gas and water being mixed by a mixer. Considering the two schemes in view of saturated solubility concentration, it is desirable to increase the mixture concentration by the first scheme.

As an ozone gas generating method, there are the electric discharge scheme in which oxygen gas flowing in a cell where an electrode is installed is processed by silent discharge, to thereby generate ozone gas, and the electric field scheme in which an electrode is installed in pure water and electric field is applied to the water, to thereby generate ozone gas. Comparing the two ozone gas generating methods against each other, with the current technique, the former discharge scheme is easier to obtain ozone gas of high concentration, and the maximum concentration reaches 300 to 350 g/m$^3$ (N) at the current level.

However, even when the ozone gas of about 350 g/m$^3$ (N) is used, the mix concentration of the room temperature ozonated water improves only by about 10 to 20% of the current level. In order to generate room temperature ozonated water of further higher concentration, the ozone gas concentration technique is required. According to the ozone concentrating method disclosed in Patent Document 4, the discharging pressure of the concentrated ozone gas is about 0.05 MPa (G). This cannot satisfy the required pressure of the concentrated ozone gas for mixing the ozone gas and pure water, i.e., 0.2 MPa (G) or more. Thus, it can be seen that high concentration ozonated water cannot be generated only by the currently proposed ozone gas concentrating methods.

In view of the foregoing, an object of the present invention is to establish the high pressure supply method of concentrated ozone gas, and to provide a producing method for high concentration room temperature ozonated water and a producing device for the same.

Solutions to the Problems

In order to achieve the object stated above, the present invention according to claim 1 provides a high concentration ozonated water producing method, with a combination of an ozone gas generating operation, an ozone gas concentrating operation, a concentrated ozone gas boosting operation, a cooling operation in the ozone gas boosting operation, and an operation of dissolving the boosted concentrated ozone gas into water.

The invention according to claim 2 is a high concentration ozonated water producing device, wherein a high-pressure concentrated ozone gas supplying system is connected to an ozone gas dissolving unit so as to establish communication between each other, the high-pressure concentrated ozone gas supplying system including an ozone gas generating unit for generating ozone gas, an ozone gas concentrating unit for concentrating the generated ozone gas, a concentrated ozone gas pressurizing unit for boosting the concentrated ozone gas led out from the ozone gas concentrating unit, and a cooling mechanism for cooling the concentrated ozone gas pressurizing unit.

The invention according to claim 3 provides a high concentration ozonated water producing device wherein, in addition to the structure according to claim 2, a monitor that measures temperature, pressure, and flow rate of the boosted high pressure concentrated ozone gas, and a control unit that controls cooling of the concentrated ozone gas pressurizing unit based on detection data from the monitor are included.

The invention according to claim 4 provides a high concentration ozonated water producing device wherein, in addition to the structure according to one of claims 2 and 3, the ozone gas dissolving unit is arranged at a pure water supplying system.

Effect of the Invention

With the present invention, concentrated ozone gas is boosted to obtain high pressure concentrated ozone gas. In boosting the concentrated ozone gas, by cooling the concentrated ozone gas pressurizing unit, the ozone decomposition attributed to catalysis occurring inside the compression chamber of the pressurizing device and the ozone decomposition attributed to heat of compression are suppressed, and high concentration and high pressure ozone gas can stably be supplied. Thus, high concentration ozonated water of 320 mg/L or more can be generated.

EMBODIMENTS OF THE INVENTION

Figure 1:
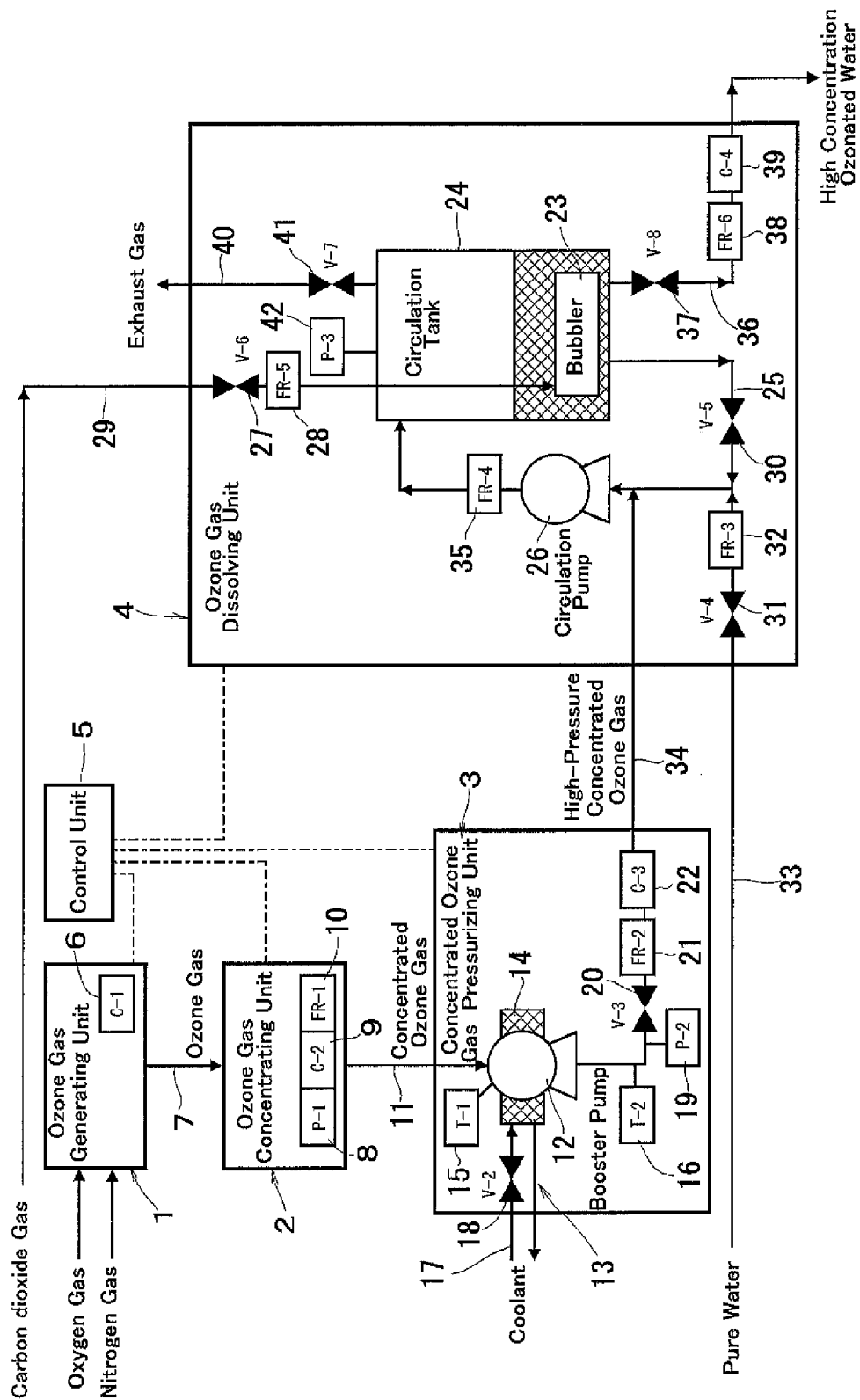
FIG. 1 is a schematic configuration diagram of a high concentration ozonated water producing device showing one embodiment of the present invention.

The present high concentration ozonated water producing device is structured by: an ozone gas generating unit (1); an ozone gas concentrating unit (2) that concentrates the ozone gas generated by the ozone gas generating unit (1); a concentrated ozone gas pressurizing unit (3) that pressurizes the concentrated ozone gas concentrated by the ozone gas concentrating unit (2) to a prescribed pressure; an ozone gas dissolving unit (4) that dissolves the high pressure concentrated ozone gas pressurized to the prescribed pressure by the concentrated ozone gas pressurizing unit (3) into pure water; and a control unit (5) that controls the operations of the ozone gas generating unit (1), the ozone gas concentrating unit (2), the concentrated ozone gas pressurizing unit (3), and the ozone gas dissolving unit (4).

The ozone gas generating unit (1) serving as the ozone gas supply source includes a discharge type ozone generator (not shown) that generates ozone gas by processing oxygen gas flowing in a cell provided with an electrode through silent discharge. As the raw material gas flowing in the ozone generator, the mixed gas of nitrogen gas and oxygen gas, or clean atmosphere from which dust has been removed by an air cleaner can be used. The concentration of the ozone gas generated by the ozone generator is measured by an ozone gas concentration meter (6) of the ultraviolet absorption scheme installed in the ozone gas generating unit (1), and the measurement value is input to the control unit (5).

The ozone gas concentrating unit (2) supplied with ozone gas via an ozone gas supplying path (7) from the ozone gas generating unit (1) achieves concentration through PSA process, which uses an ozone adsorption tower (not shown) filled with adsorbent such as silica gel selectively adsorbing ozone gas. The lead out pressure and concentration of the ozone gas is measured by an ozone gas pressure gage (8) and an ozone gas concentration meter (9), and the lead out flow rate of the concentrated ozone gas is controlled by commands from the control unit (5) to achieve a prescribed flow rate while being measured by an ozone gas flowmeter (10).

The concentrated ozone gas pressurizing unit (3) connected to the ozone gas concentrating unit (2) so as to establish communication between each other by a concentrated ozone gas supplying path (11) includes a booster pump (12) made of stainless-steel. The booster pump (12) has its pump head portion cooled by a cooling mechanism (13). The cooling mechanism (13) allows coolant to pass through a coolant jacket (14) formed at the pump head portion, to thereby cool the pump head portion. As to the cooling, the temperature of the pump head is detected by a thermometer (15), and the temperature of the high pressure concentrated ozone gas is detected by a thermometer (16). A coolant flow path opening-closing valve (18) interposed in a coolant passage (17) is controlled to open and close such that the detection temperatures become equal to or less than prescribed temperatures. At the discharge path portion of the booster pump (12) in the concentrated ozone gas pressurizing unit (3), the thermometer (16), an ozone gas pressure gage (19), a high pressure concentrated ozone gas flow path opening-closing valve (20), an ozone gas flowmeter (21), and an ozone gas concentration meter (22) are arranged in order. The flow path opening-closing valve (20) is controlled to open and close by commands from the control unit (5) such that the flow rate of the high pressure concentrated ozone gas supplied from the concentrated ozone gas pressurizing unit (3) becomes a prescribed flow rate.

As the booster pump (12), in order to eliminate the influence of oil when pressurizing and compressing, a diaphragm pump is preferable. The diaphragm pump in which the diaphragm membrane is made of fluororesin or stainless steel is more preferable.

The ozone gas dissolving unit (4) includes a circulation tank (24) inside of which a bubbler (23) is arranged, a circulation path (25) through which pure water stored in the circulation tank (24) circulates, and a circulation pump (26) arranged at the circulation path (25). To the bubbler (23), a carbon dioxide gas supplying path (29) at which a flow path opening-closing valve (27) and a carbon dioxide gas flowmeter (28) are arranged is connected. Further, a pure water supplying path (33) is provided with a pure water flow path opening-closing valve (31) and a pure water flowmeter (32) between a circulation water flow path opening-closing valve (30) and the circulation pump suction port, the circulation water flow path opening-closing valve (30) being inserted into the circulation path (25) and arranged on the suction side of the circulation pump (26). The pure water supplying path (33) and a high pressure concentrated ozone gas supplying path (34) led from the concentrated ozone gas pressurizing unit (3) are connected to each other to establish communication. Further, an ozonated water flowmeter (35) is arranged on the discharging side of the circulation pump (26) at the circulation path (25). Further, from the bottom portion of the circulation tank (24), a high concentration ozonated water output path (36) is led out. At the high concentration ozonated water output path (36), a high concentration ozonated water flow path opening-closing valve (37), a high concentration ozonated water flowmeter (38), and an ozonated water concentration meter (39) are arranged. The reference sign (40) denotes an exhaust gas path led out from the ceiling portion of the circulation tank (24). At the exhaust gas path (40), an exhaust gas path opening-closing valve (41) is arranged. The reference sign (42) denotes a pressure gage detecting the internal pressure of the circulation tank (24).

Next, a description will be given of the producing procedure of high concentration ozonated water using the high concentration ozonated water producing device described above.

The discharge type ozone generator installed in the ozone gas generating unit (1) is supplied with a mixed gas in which nitrogen gas is mixed by 0.1% into oxygen gas (purity 99.999%). By silent discharge of the discharge type ozone generator, ozone gas whose concentration is 250 g/m$^3$ (N) is generated. The ozone gas concentration is measured by the ozone gas concentration meter (6) of the ultraviolet absorption scheme.

The ozone gas generated by the ozone gas generating unit (1) is supplied to the ozone gas concentrating unit (2), and the ozone gas introduced from the ozone gas generating unit is concentrated by the ozone gas concentrating unit (2) of the adsorption scheme such that the concentration is doubled, i.e., 500 g/m$^3$ (N). The concentrated ozone gas concentration and the lead out pressure at the ozone gas concentrating unit (2) are measured by the ozone gas concentration meter (9) and the ozone gas pressure gage (8), and the lead out flow rate of the concentrated ozone gas is controlled to be 10 NL/min in accordance with commands from the control unit (5), while being measured by the ozone gas flowmeter (10).

The concentrated ozone gas concentrated by the ozone gas concentrating unit (2) is supplied to the concentrated ozone gas pressurizing unit (3), and boosted by the booster pump (12) to be 0.2 MPa (G) or more. In order to suppress decomposition of the concentrated ozone gas at the stainless steel surface on the inner face of the pump head by the catalyst effect during the boosting work performed by the booster pump (12), by previously causing the high concentration ozone gas of 1285 g/m$^3$ (N), for example, to flow over the stainless steel surface on the inner face of the pump head for about 12 hours, the passivation process is achieved and the pump head portion is cooled by the coolant.

When the concentrated ozone gas is pressurized, the temperature of the pump head is detected by the thermometer (15). At the same time, the temperature of the high pressure concentrated ozone gas discharged from the pump is detected by the thermometer (16). Then, the coolant flow path opening-closing valve (18) interposed in the coolant passage (17) is controlled to open and close such that the surface temperature of the pump head on the discharging side becomes 30° C. or less. Here, the surface temperature of the pump head is set to 30° C. or less because the internal temperature of the pump head being higher than 40° C. activates self-decomposition of ozone. Further, the ozone gas concentration of the high pressure concentrated ozone gas having been boosted is measured by the ozone gas concentration meter (22). The flow rate of the high pressure concentrated ozone gas is monitored by the ozone gas flowmeter (21) and the flow path opening-closing valve (20) is controlled to open and close by commands from the control unit (5), such that the flow rate of the high pressure concentrated ozone gas becomes 10 NL/min.

The high pressure concentrated ozone gas pressurized by the concentrated ozone gas pressurizing unit (3) is supplied to the ozone gas dissolving unit (4) and dissolved into pure water, to become high concentration ozonated water. At the ozone gas dissolving unit (4), prior to the introduction of the high pressure concentrated ozone gas, pure water is stored in the circulation tank (24) by 20 L. The pure water stored in the circulation tank (24) is circulated by the circulation pump (26). The high pressure concentrated ozone gas pressurized by the concentrated ozone gas pressurizing unit (3) is introduced and dissolved on the upstream side to the circulation pump (26) of the circulating pure water. Here, the carbon dioxide gas is supplied at the flow rate of 0.8 NL/min to the bubbler (23) in the circulation tank (24), to generate bubbles in the ozonated water stored in the circulation tank (24). Thus, the carbon dioxide gas is dissolved into the ozonated water, and the concentration of the ozonated water is stabilized.

The circulation flow rate in the dissolving work is 16 L/min, as the measurement value measured by the ozonated water flowmeter (35) arranged on the discharging side of the circulation pump (26). This is set to be four times as great as the amount of high concentration ozonated water output from the circulation tank (24). Further, the internal pressure of the circulation tank (24) is maintained at 0.4 MPa (G).

The output flow rate of the high concentration ozonated water generated in this manner is measured by the high concentration ozonated water flowmeter (38) arranged at the high concentration ozonated water output path (36). Based on the measurement value, the ozonated water flow path opening-closing valve (37) is controlled to open and close, and the high concentration ozonated water is output to the outside of the device at the flow rate of 4 L/min, to be supplied to the high concentration ozonated water-using plant. The concentration of the output high concentration ozonated water is 341 mg/L at the high concentration ozonated water-using plant.

It is to be noted that, the pure water supply to the circulation tank (24) is controlled such that the same amount as the output flow rate of the high concentration ozonated water is constantly supplied, using the pure water flowmeter (32) and the pure water flow path opening-closing valve (31) interposed in the pure water supplying path (33).

Further, the control by the device described above is automatically exerted by the control unit (5) receiving the detection values of the thermometers, the pressure gages, the flowmeters, and the ozone gas concentration meter, and the flow path opening closing valves opening and closing in accordance with commands from the control unit.

When it is desired to increase the output flow rate of the high concentration ozonated water, it can be achieved by increasing the supply amount of the concentrated ozone gas, the supply amount of the pure water, the circulation amount of the ozonated water, and the supply amount of the carbon dioxide gas in accordance with the desired increase amount. For example, when it is desired for the output flow rate of the high concentration ozonated water to be twice as great as that in the foregoing embodiment, i.e., 8 L/min, by generating the ozonated water under the condition of: the flow rate of the high pressure concentrated ozone gas is 13 NL/min which is 1.3 times as great as that in the foregoing embodiment; the supply amount of the pure water is 8 L/min which is identical to the ozonated water output flow rate; the circulation flow rate of the ozonated water is 32 L/min which is four times as great as the output flow rate; and the carbon dioxide gas amount is 1 NL/min which is 1.3 times as great as that in the foregoing embodiment. Thus, the high concentration ozonated water whose concentration is 347 mg/L can be obtained (see part A in FIG. 2).

Figure 2:
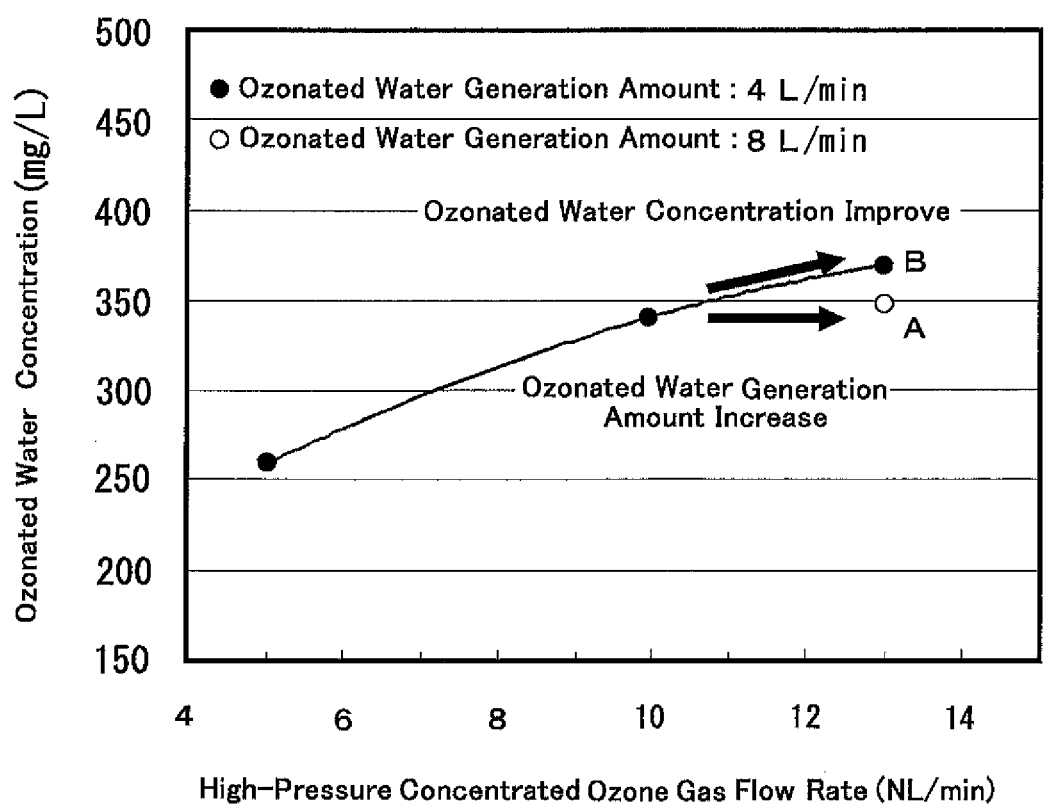
FIG. 2 is a graph showing the relationship between the supply amount of high pressure concentrated ozone gas and the ozonated water concentration.

On the other hand, in the case where it is desired that the output flow rate of the high concentration ozonated water remains 4 L/min while having the concentration of the ozonated water increased to 370 mg/L, as represented by part B in FIG. 2, the flow rate of the high pressure concentrated ozone gas should be increased to 13 NL/min.

INDUSTRIAL APPLICABILITY

The present invention can be used for cleaning precision electronic components such as semiconductors, liquid crystal displays and the like and general industrial components, or cleaning and disinfecting pharmaceutical and food appliances, food and the like.

DESCRIPTION OF REFERENCE SIGNS

1 . . . ozone gas generating unit, 2 . . . ozone gas concentrating unit, 3 . . . concentrated ozone gas pressurizing unit, 4 . . . ozone gas dissolving unit, 5 . . . control unit, 13 . . . cooling mechanism of concentrated ozone gas pressurizing unit.

The invention claimed is:

1. A method for producing high concentration ozonated water, comprising:
   generating an ozone gas;
   concentrating generated ozone gas by PSA treatment using an ozone adsorption tower filled with adsorbent for selectively adsorbing ozone gas in order to obtain concentrated ozone gas;
   boosting a pressure of the concentrated ozone gas with a booster pump;
   cooling a pump head of the booster pump while boosting the concentrated ozone gas such that a surface temperature of the pump head on a discharging side becomes 30° C. or less; and
   introducing boosted concentrated ozone gas into circulating pure water or circulating ozonated water so as to dissolve the boosted concentrated ozone gas into the circulating pure water or circulating ozonated water.

2. The method according to claim 1, wherein
   the boosting the pressure of the concentrated ozone gas comprises boosting the pressure of the concentrated ozone gas to 0.2 MPaG or more.

3. The method according to claim 1, further comprising:
   providing an ozone gas to the inner surface of the booster pump and performing a passivation process to the inner surface of the booster pump before the boosting the pressure of the concentrated ozone gas with the booster pump.

* * * * *